United States Patent
Völkel

[11] Patent Number: 6,031,805
[45] Date of Patent: Feb. 29, 2000

[54] ELECTRONIC APPARATUS

[75] Inventor: Andreas Völkel, Wetzlar, Germany

[73] Assignee: U.S. Philips Corporation, New York, N.Y.

[21] Appl. No.: 08/946,783

[22] Filed: Oct. 8, 1997

[30] Foreign Application Priority Data

Oct. 19, 1996 [DE] Germany .............. 196 43 204

[51] Int. Cl.$^7$ .................................................. G11B 7/00
[52] U.S. Cl. ............................................................ 369/58
[58] Field of Search .................... 369/34, 30, 32, 369/54, 58, 275.3, 94

[56] References Cited

U.S. PATENT DOCUMENTS

| | | | |
|---|---|---|---|
| 5,430,553 | 7/1995 | Misono et al. | 358/342 |
| 5,446,714 | 8/1995 | Yoshio et al. | 369/48 |
| 5,471,606 | 11/1995 | Huang et al. | 369/44.26 |
| 5,546,369 | 8/1996 | Lee et al. | 369/54 |
| 5,752,009 | 5/1998 | Nakahara et al. | 369/30 |
| 5,757,752 | 5/1998 | Sako | 369/275.3 |
| 5,793,726 | 8/1998 | Nagano | 369/32 |
| 5,856,958 | 1/1999 | Yokota et al. | 369/32 |

*Primary Examiner*—Nabil Hindi
*Attorney, Agent, or Firm*—Edward W. Goodman

[57] ABSTRACT

A electronic apparatus reproduces information stored on information discs in accordance with a first standard and in accordance with at least a second standard. The electronic apparatus can be controlled by first control information in accordance with a first format, and a converter circuit converts the first control information when using an information disc in accordance with the second information-disc standard, into second control information in accordance with a second format. Thus, the electronic apparatus can be controlled by means of the first control information both when information discs in accordance with the first standard are played.

9 Claims, 2 Drawing Sheets

ELECTRONIC APPARATUS

FIELD OF THE INVENTION

The invention relates to the field of information storage and retrieval using disk-shaped record carriers.

BACKGROUND OF THE INVENTION

The invention relates to an electronic apparatus for reproducing information stored on information discs in accordance with a first standard and in accordance with at least a second standard.

Such an electronic apparatus is known, for example, from U.S. Pat. No. 5,430,553. This known apparatus is capable of playing CD-DA, CD-I and CD-I/CD-DA information discs. Depending on the relevant CD type, this electronic apparatus selects a different control program and presents a different user area on a display to the user. The above citation is hereby incorporated in whole by reference.

SUMMARY OF THE INVENTION

It is an object of the invention to provide an apparatus of the type defined in the opening paragraph, which is easy to control and versatile in use.

According to the invention, electronic apparatus is controlled by first control information in accordance with a first format. A converter circuit converts the first control information in the case of an information disc in accordance with the second information-disc standard, into second control information in accordance with a second format, such that the electronic apparatus can be controlled by the first control information both when information discs in accordance with the first standard are played and when information discs in accordance with the second standard are played.

The first control information is the control information by which devices for playing the information discs in accordance with the first standard, can be controlled directly. The second control information is the control information by which the devices for reproducing the information stored on information discs in accordance with the second standard can be controlled directly.

The electronic apparatus in accordance with the invention is intended both for information stored on information discs in accordance with a first standard and for information stored on information discs in accordance with a second standard. Using first control information, the apparatus can be controlled in a unitary manner both for the reproduction of information in accordance with the first standard and for the reproduction of information in accordance with the second standard. This is achieved by the converter circuit. When the apparatus is used for reproducing information from the information disc in accordance with the first standard, the first control information is not modified by the converter circuit, i.e., the first control information appears both on the input of the converter circuit and on the output of the converter circuit. When the apparatus is used for reproducing information stored on information discs in accordance with the second standard, the first control information is applied to the input of the converter circuit and is converted into control information in accordance with the second format by the converter circuit. As a result of this, the electronic apparatus can be controlled in a unitary manner by the first control information both when the information discs in accordance with the first standard are played and when information discs in accordance with the second standard are played. This unitary control has the advantage that, external control devices which generate the first control information can control both apparatuses adapted to play only information discs in accordance with the first standard and apparatuses adapted to play information discs in accordance with both the first and the second standards.

The first and the second control information comprise control commands, particularly the control commands for accessing individual playing units of the information discs.

An advantageous embodiment of the invention is characterized by a converter circuit adapted to convert second status information in accordance with the second format, into first status information in accordance with the first format in the case of an information disc in accordance with the second standard such that the first status information can be made available at an output interface of the electronic apparatus both when information discs in accordance with the first standard are played and when information discs in accordance with the second standard are played.

The status information, originating from the information disc, can be, for example, information about the overall playing time of the information disc, the playing times of the individual tracks, the residual playing time or the like.

The first status information is the information made available to the output interface of the electronic apparatus when information discs in accordance with the first standard are played. This first status information can then be further processed by an external control device and can be displayed, for example, by a display of the external control device.

The second status information is the information transferred to the converter circuit by the reproduction unit when information discs in accordance with the second standard are played. This second status information, available in the second format, is converted into first status information in accordance with the first format by the converter circuit. This second status information converted into the format of the first status information can now also be further processed by the control device and displayed by the display of the control device similarly to the first status information.

Thus, the converter circuit enables the same control device and the same display for the status information to be used both when information discs in accordance with the first standard are played and when information discs in accordance with the second standard are played.

In an advantageous embodiment of the invention, the first standard is the Compact Disc Digital Audio System standard and the second standard is the Compact Disc Video System standard.

Electronic apparatuses capable of playing information discs in accordance with the Compact Disc Digital Audio System standard are very common, while apparatuses capable of playing information discs in accordance with the Compact Disc Video System standard are comparatively rare. The electronic hardware of audio CD players is substantially simpler than that of apparatuses intended for playing CD video information discs.

In the case of CD audio information discs, the individual playing units are referred to as tracks. There is a lead-in track in which the table of contents (TOC) of the individual tracks is stored. Track 1 then constitutes the first playing unit, for example, the first song of the audio CD, the track 2 constitutes the second playing unit etc.

In the case of video information discs, the standards do not include a unitary dimension. The individual playing units of the video CDs, in contradistinction to those of the audio CD, do not correspond to individual tracks. There are video information discs having a track 1 and a track 2, the individual playing units being arranged within the track 2 and being referred to as entry 1 to entry n. Other video information discs comprise n tracks, in which case, the track 2 represents the first playing unit (entry 1), the track 3 the second playing unit (entry 2) etc. Other video information discs also comprise n tracks but the individual tracks each include a plurality of playing units (entries). There are, for example, video information discs whose track 2 includes the playing units "entry 1" and "entry 2".

Both in the case of audio information discs, and video information discs the user is, as a rule, only interested in those playing units which are perceptible to him, for example, printed on the cover of the information disc. By using the converter circuit in accordance with the invention, it is possible to display the individual playing units on the display screen of the control device in the same form as they have been printed on the cover of the information disc.

A further advantageous embodiment of the invention is characterized by a converter circuit is adapted to generate a table of contents of the information disc (TOC) which specifies the total number of playing units and the overall playing time of all the playing units for an information disc in accordance with the second information-disc standard.

The lead-in track of an audio information disc includes an audio TOC, which assigns the playing time to each individual track and which in addition indicates an overall playing time. As a rule, a TOC of this form is not available in the case of a video information disc. Therefore, the converter circuit has been provided in order to derive from the second status information, which is applied to the converter circuit when information discs in accordance with the second standard are played, a table of contents for the information disc (TOC) similar the audio TOC. For this purpose, the respective playing time is assigned to the playing units (entries) and an overall playing time is calculated.

Preferably, the electronic apparatus in accordance with the invention, is used for receiving the first control information from a car radio.

In the market many car radios are available which include a control interface which can be used for controlling audio CD players. Without any further modification, such car radios can be used for controlling the electronic apparatus in accordance with the invention.

Those skilled on the art will understand the invention and additional objects and advantages of the invention by studying the description of preferred embodiments with reference to the following drawings which illustrate the features of the appended claims.

DETAILED DESCRIPTION OF THE PREFERRED EMBODIMENTS

Figure 1:
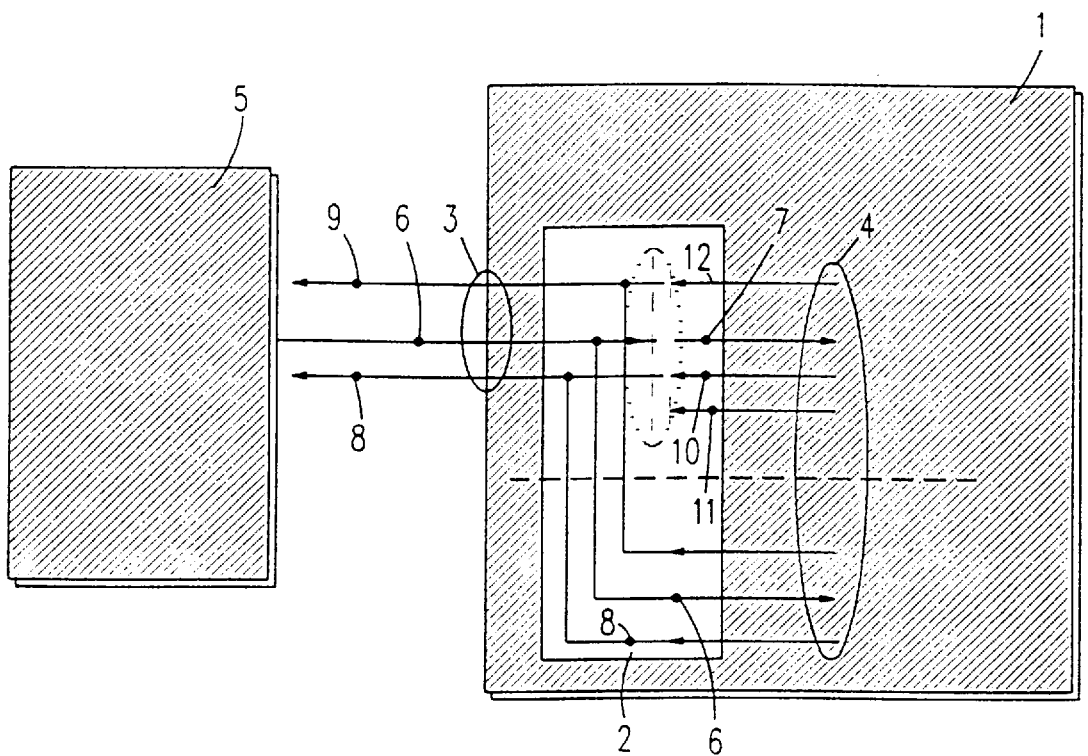
FIG. 1 is a basic functional diagram of an electronic apparatus for playing audio and video information discs, comprising a converter circuit for the conversion of control information and status information, this circuit being coupled to a control device.

FIG. 1 shows an electronic apparatus 1 adapted to play audio information discs (hereinafter referred to as audio CDs) and to play video information discs (hereinafter referred to as video CDs). The electronic apparatus 1 includes a converter circuit 2 having an external interface 3 and an internal interface 4. The external interface 3 of the electronic apparatus 1 is coupled to a control device 5. The control device 5 supplies first control information in the form of track commands 6 to the external interface 3 of the converter circuit 2. The track commands 6 serve to address and play the individual playing units available on the audio CD or the video CD. The track commands 6 have the format required to control the individual playing units of an audio CD. In an audio CD the individual playing units are identical to the tracks and can be controlled directly by means of the track commands 6. As regards the track commands 6 applied to the external interface 3, the converter circuit has the following function.

When the electronic apparatus 1 is used for playing an audio CD, the track commands 6 are not modified by the converter circuit 2 and are transferred directly to the internal interface 4. However, when the apparatus is used for playing a video CD, the converter circuit 2 converts the track commands 6 into entry commands 7. These entry commands 7 have such a format that they can control the individual playing units of the video CD, which are referred to as entries in the case of a video CD. The individual entries of a video CD are assigned to the tracks of a video CD in different manners for the individual video CDs. There are video CDs where all entries are arranged as sub-units within the track 2. For other video CDs, the entry 1 is assigned to the track 2, the entry 2 to the track 3, the entry 4 to the track 5, etc. Still other video CDs have a plurality of tracks and a plurality of entries assigned to these tracks. It is then possible, for example, that the track 2 comprises the entries 1 and 2, the track 3 the entries 3, 4 and 5, etc. In order to enable a unitary control of the individual playing units by the control device with the aid of the unitary track commands 6 in spite of the many coding variants, the above-mentioned conversion of the track commands 6 into the entry commands 7 occurs when a video CD is played.

The external interface 3 supplies track status information 8 and TOC track data 9 to the control device 5. Track status information 8, is information about the track selected by means of the control device 5, for example, the overall playing time of the track or the title of the track. When the electronic apparatus 1 plays an audio CD, the converter circuit 2 receives the track status information 8 which is already in the correct format at the internal interface 4. Then the converter circuit 2 transfers the track status information 8 directly to the external interface 3 without any change. When the electronic apparatus 1 plays a video CD entry, status information 10 and track status information 11 are applied to the internal interface 4 of the converter circuit 1. However, since the track status information of the video CD does not represent the individual playing units about which the user wishes to be informed, this track status information is not transferred from the converter circuit 2 to the control device 5. The entries of the video CD represent the individual playing units about which the user wishes to be informed. Therefore, the entry status information 10 is converted into the format of the track status information 8 when a video CD is played. If, for example, the overall playing time of the entries 2 is transferred to the converter circuit 2 as entry status information 10 when a video CD is played, the converter circuit 2 converts this information such that it transfers the overall playing time of the track 2 as track status information 8 to the control device 5 in the audio CD format. The converter circuit 2 transfers TOC track data 9 to the control device 5 via the external interface 3. This TOC track data 9 represents a table of contents (TOC) which specifies the total number of playing units as well as the addresses and positions of the individual tracks. This TOC track data is stored in a lead-in track in the case of an audio CD. Before an audio CD is played, this lead-in track is read out by the electronic apparatus 1 and the corresponding TOC track data is transferred to the control device 5. When the electronic apparatus plays an audio CD the converter circuit 2 receives this TOC track data directly on the internal interface 4 and the converter circuit 2 transfers this data unmodified to the external interface 3. When the electronic apparatus plays a video CD, TOC entry data 12 is applied to the internal interface 4. This TOC entry data 12 includes information about the contents of the video CD but is not compatible with the TOC of the audio CD. The control device 5, which is adapted to receive TOC track data 9 in the audio format, cannot process the TOC entry data 12. In particular, the TOC entry data 12 do not include a table of contents in such a form that the individual entries, which represent the playing units of a video CD, directly correspond to the individual playing times of the entries. The TOC entry data 12 is stored in the lead-in track of the video CD and in a storage area Entries, VCD. The TOC entry data 12 is transferred to the external interface 4 of the converter circuit 2 in a read-in phase of the video CD before the video CD is played. The converter circuit 2 now converts the TOC entry data 12 such that the data becomes compatible with the TOC of an audio CD and is transferred to the control device 5 as TOC track data 9. The control device 5 can now process this TOC track data 9 and can display a corresponding table of contents of the video CD on a display screen.

Figure 2:
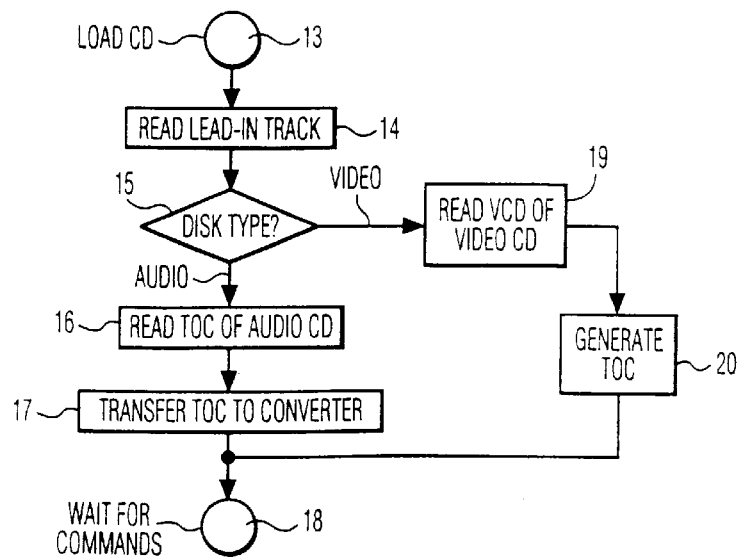
FIG. 2 is a basic flowchart of the operation of the converter circuit during read-in of an information disc.

FIG. 2 is a flowchart of a read algorithm which is a software implementation of the converter circuit 2. This algorithm is carried out each time that a CD is loaded into the electronic apparatus.

A first block 13 represents the event "CD in", i.e., a CD has been loaded into the electronic apparatus 1. In the next block 14, the lead-in track is read out. The track includes a specification indicating whether the disc is an audio CD or a video CD. In the following block 15, it is decided with the aid of the information read from the lead-in track, whether the disc is an audio CD or a video CD. In the case of an audio CD, the algorithm proceeds with the block 16, in which the TOC of the audio CD is read. This TOC of the audio CD is then transferred to the control device 5 in the block 17. The converter circuit then assumes a waiting mode 18 in which it waits until the external interface 3 of the converter circuit 2 receives track commands 6 for accessing individual tracks. When, in the block 15 a video CD is detected, the storage area Entries. VCD of the video CD is read in the block 19. This storage area Entries. VCD includes information about the correspondence between the individual tracks and the entries and about the playing time of the individual tracks or entries. However, no TOC is available which is compatible with the TOC of an audio CD. Therefore, in a block 20 a TOC for the video CD is generated from the information of the storage area Entries VCD and the lead-in track. The TOC is compatible with the TOC of an audio CD and can consequently, also be processed by a control device which is only capable of reading audio CD TOCs. After this generation of the "audio-CD compatible video TOC," the converter circuit 2 assumes the waiting state of the block 18 and awaits track commands from the control device 5.

Figure 3:
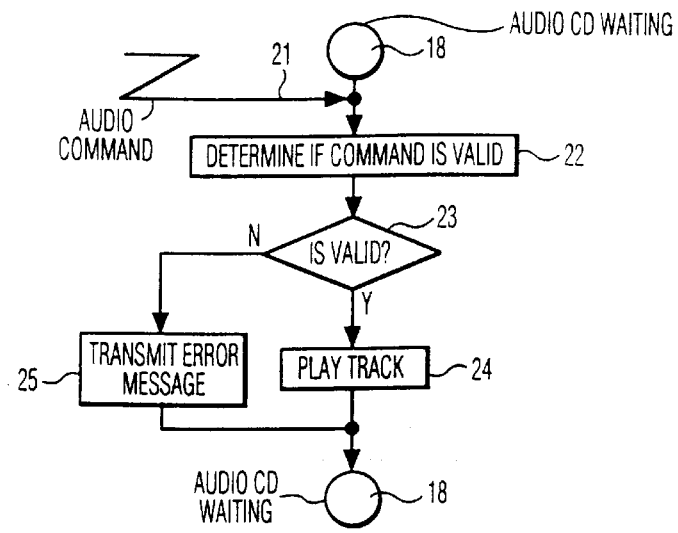
FIG. 3 is a basic flowchart of the operation of the converter circuit when a playing unit of an audio CD is accessed.

FIG. 3 shows the flowchart of the software algorithm of the converter circuit 2 in the case that a track is accessed when an audio CD has been detected in the initialization process in accordance with FIG. 2.

The block 18 represents a waiting state of the software algorithm and is identical to the block 18, in FIG. 2. If, in the waiting state 18 the event 21 occurs that the control device 5 transfers a track command 6 to the converter circuit 2, it is subsequently ascertained in a block 22 whether this command is a valid track command. This is decided in a block 23. When the track command is valid, the corresponding track is accessed, in a block 24 and, subsequently, this track is played back by the electronic apparatus. After this, the algorithm again proceeds to the waiting state 18. When the track command is found not to be valid in the block 23, a transmission error message is transferred to the control device 5 in a block 25 and the user can be informed about an invalid access, for example, by the display. This can be the case, for example, when a track 10 is requested to be accessed but the relevant CD has only tracks 1 to 8. After the transfer of the error message, the software algorithm again proceeds to the waiting state 18 and awaits new track commands.

Figure 4:
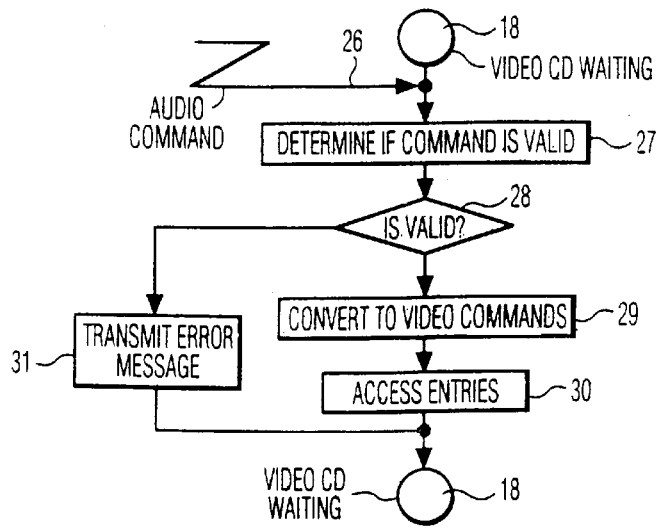
FIG. 4 is a basic flowchart of the operation of the converter circuit when a playing unit of a video CD is accessed.

FIG. 4 shows the flowchart of the software algorithm of the converter circuit 2 in the case that a video CD has been read out by the algorithm in accordance with FIG. 2, and the software algorithm is in the waiting state 18 in accordance with FIG. 2.

The software algorithm leaves the waiting state 18 when the event 26 is the transfer of a track command 6 from the control device 5 to the converter circuit 2. Subsequently, it is ascertained, in a block 27, whether the transmitted track command 6 is valid. This is decided in a block 28. When, in the block 28, the track command is found to be valid, the track commands 6 are converted into entry commands 7 in a block 29 and, subsequently, the relevant entries of the video CD are accessed in a block 30. After the relevant entry of the video CD has been accessed, the software algorithm again proceeds to the waiting state 18. When the track command 6 is found not to be valid in the block 28, a transmission error message is transferred to the control device 5 in a block 31. After this, the software algorithm proceeds to the waiting state 18 and again awaits a new track command, which, when necessary, is again converted into an entry command in the block 29.

The present invention provides for controlling CD multi-standard players (single-CD players as well as CD changers) which are capable of playing different CD types (audio CDs video CDs, CD-Is, CD-ROMs), with the some control information (command sequences) for the individual playing units. It is possible to use the same command sequences regardless of whether a video CD or an audio CD is played. The invention proposes an object-oriented approach, i.e., in the external interface of the electronic apparatus 1, the unitary command sequences of the control device are directly converted into command sequences capable of controlling the playing units of the CD type to be played. As a result, it is not necessary to provide a specific control program for each type of CD.

In particular, the electronic apparatus in accordance with the invention can also be controlled by control devices which are already on the market and which are adapted to control only CD audio apparatuses. This is particularly so in the case of car radios, which generally have a control terminal for a CD audio apparatus. These car radios can now also control the electronic apparatus in accordance with the invention without any further modification.

The invention has been disclosed with reference to specific preferred embodiments to enable those skilled in the art to make and use the invention, and to describe the best mode contemplated for carrying out the invention. Those skilled in the art may modify these embodiments or provide other embodiments or provide other embodiments without departing from the spirit of the invention. Thus, the scope of the invention is only limited by the following claims:

I claim:

1. A system comprising:
   electronic apparatus for reproducing information stored on information discs in accordance with a first standard, and for reproducing information stored on an information discs in accordance with at least a second standard;
   means for controlling the electronic apparatus, said controlling means generating first control information in accordance with a first format; and
   a converter circuit having means for converting the first control information, when an information disc in accordance with the second standard is loaded in said electronic apparatus, into second control information in accordance with a second format, whereby said controlling means generates the first control information both when information discs in accordance with the first standard and when information discs in accordance with the second standard are loaded in said electronic apparatus, while the electronic apparatus receives the first control information from the converter circuit when an information disc in accordance with the first standard is loaded in said electronic apparatus, and the electronic apparatus receives the second control information from the converter circuit when an information disc in accordance with the second standard is loaded in said electronic apparatus.

2. The system as claimed in claim 1, wherein the electronic apparatus provides first status information in a first format from information discs in accordance with the first standard, and second status information in a second format from information discs in accordance with the second standard, and wherein the converter circuit includes means for converting the second status information in the second format into first status information in the first format when an information disc in accordance with the second standard is loaded in said electronic apparatus, whereby said controlling means receives the first status information both when information discs in accordance with the first standard are loaded in said electronic apparatus, and when information discs in accordance with the second standard are loaded in said electronic apparatus.

3. The system as claimed in claim 1, wherein the first standard is the Compact Disc Digital Audio System standard, and the second standard is the Compact Disc Video System standard.

4. The system as claimed in claim 1, wherein individual playing units stored on the information disc, are selectable by said controlling means generating the first control information.

5. The system of claim 1, wherein the converter circuit includes means for generating a table of contents for the controlling means when an information disc in accordance with the second standard is loaded in said electronic apparatus, said table of contents specifying a total number of playing units and an overall playing time of all the playing units on an information disc in accordance with the second standard.

6. A method of using electronic apparatus for reproducing information stored on information discs in accordance with a first standard, with information discs in accordance with a second standard, said method comprising the steps:
   controlling the electronic apparatus using first control information in accordance with a first format; and
   converting the first control information, when using an information disc in accordance with the second standard, into second control information in accordance with a second format such that the electronic apparatus is controllable by the first control information both when information discs in accordance with the first standard and when information discs according to the second standard are loaded in said electronic apparatus.

7. A car-radio system comprising:
   an electronic apparatus for reproducing information stored on information discs in accordance with a first standard, and for reproducing information stored on information discs in accordance with a second standard;
   means for controlling the electronic apparatus using first control information in accordance with a first format; and
   a converter circuit with means for converting the first control information, when an information disc in accordance with a second standard is loaded in said electronic apparatus, into second control information in accordance with a second format, whereby said controlling means generates the first control information both when information discs in accordance with the first standard and when information discs in accordance with the second standard are loaded in said electronic apparatus, while the electronic apparatus receives the first control information from the converter circuit when an information disc in accordance with the first standard is loaded in said electronic apparatus, and the electronic apparatus receives the second control information from the converter circuit when an information disc in accordance with the second standard is loaded in said electronic apparatus.

8. A CD-changer system comprising:
   an electronic apparatus for reproducing information stored on information discs in accordance with a first standard, and for reproducing information stored on information discs in accordance with a second standard;
   means for selectively loading information discs in accordance with either said first standard or said second standard into said electronic apparatus
   means for controlling the electronic apparatus using first control information in accordance with a first format; and
   a converter circuit for converting the first control information, when an information disc in accordance with the second information-disc standard is loaded in said electronic apparatus, into second control information in accordance with a second format, said controlling means generates the first control information both when information discs in accordance with the first standard and when information discs in accordance with the second standard are loaded in said electronic apparatus, while the electronic apparatus receives the first control information from the converter circuit when an information disc in accordance with the first standard is loaded in said electronic apparatus, and the electronic apparatus receives the second control information from the converter circuit when an information disc in accordance with the second standard is loaded in said electronic apparatus.

9. The system of claim 2, wherein:

the first standard is the Compact Disk Digital Audio System Standard and the second standard is the Compact Disk Video System standard;

individual playing units stored on the information disc, are selectable by the first control information; and the converter circuit includes means for generating a table of contents for the controlling means when an information disc in accordance with the second standard is loaded in said electronic apparatus, said table of contents specifying a total number of playing units and an overall playing time of all the playing units on the information disc in accordance with the second standard.

* * * * *